United States Patent [19]
Ogihara et al.

[11] Patent Number: 5,287,026
[45] Date of Patent: Feb. 15, 1994

[54] SUPERCONDUCTING MAGNETIC LEVITATION APPARATUS

[75] Inventors: Masahiro Ogihara, Amagasaki; Katsuzo Aihara, Hitachiota; Keiji Arai, Kitaibaraki; Masaki Satoh, Hitachi, all of Japan

[73] Assignee: Hitachi, Ltd., Tokyo, Japan

[21] Appl. No.: 783,779

[22] Filed: Oct. 29, 1991

[30] Foreign Application Priority Data

Oct. 29, 1990 [JP] Japan .................. 2-288536

[51] Int. Cl.$^5$ ............... H02K 41/00; B60L 13/04; H01B 12/00
[52] U.S. Cl. ....................... 310/12; 505/700; 104/281; 104/285
[58] Field of Search ............... 310/90.5, 12, 14, 13, 310/16, 54, 57; 104/91, 93, 121, 130.1, 281, 284, 285, 286; 505/1, 700, 876, 878, 902, 903, 904, 905; 318/135

[56] References Cited

U.S. PATENT DOCUMENTS

| | | |
|---|---|---|
| 3,850,109 | 11/1974 | Thornton . |
| 3,858,521 | 1/1975 | Atherton ............... 104/285 |
| 3,861,320 | 1/1975 | Lichtenberg ............... 505/904 X |
| 3,904,898 | 9/1975 | Mailfert ............... 310/12 |
| 4,868,431 | 9/1989 | Karita et al. ............... 310/12 |
| 4,879,537 | 11/1989 | Marshall et al. ............... 505/1 X |
| 4,885,273 | 12/1989 | Sugimoto et al. ............... 505/1 |
| 5,015,622 | 5/1991 | Ward et al. ............... 505/1 |

FOREIGN PATENT DOCUMENTS

| | | |
|---|---|---|
| 1-206804 | 8/1989 | Japan . |
| 1-248977 | 10/1989 | Japan . |
| 1-248979 | 10/1989 | Japan . |
| 2-188171 | 7/1990 | Japan . |

OTHER PUBLICATIONS

Toute L'Electronique No. 528, Nov. 1987, Paris Fr, pp. 16-17 "Supra-conductivite: l'age de la ceraminque".
Machine Design, vol. 58, No. 16, Jul. 1986, Cleveland US pp. 18-22; Smith "Maglev May Still Make It".

Primary Examiner—Steven L. Stephan
Assistant Examiner—E. To
Attorney, Agent, or Firm—Antonelli, Terry, Stout & Kraus

[57] ABSTRACT

A superconducting magnetic levitation apparatus for driving a floating body efficiently and controllably, for producing a strong driving force, and for generating a lifting magnetic field having a uniform intensity in a running direction and producing a guidance force in a lateral direction, to stably run the floating body. The superconducting magnetic levitation apparatus includes a lifting magnet for forming a track, a floating body made of a high-$T_c$ superconductor, and a cooling device for keeping the floating body at a superconducting state. A plurality of coils are disposed on the lifting magnet, to be used as propulsion electromagnets, for generating a magnetic field necessary for running the floating body, with each of the coils being a flat, air-core coil, and with the coils being excitable by a polyphase alternating current.

18 Claims, 6 Drawing Sheets

SUPERCONDUCTING MAGNETIC LEVITATION APPARATUS

BACKGROUND OF THE INVENTION

The present invention relates to the structure of a superconducting magnetic levitation apparatus for running a superconductor with a floating state.

In a non-contact transport system no friction is generated on a running track, and thus high speed and dust-free transportation can be achieved. A linear motor of the magnetic levitation type is known as an example of a non-contact transport system. Specifically, a magnetic levitation railroad of the magnetic repulsion type has been developed with a view to transporting passengers at high speed and is required to generate a strong magnetic field for supporting a train itself and passengers. Thus, a superconducting magnet is used in the magnetic levitation railroad. While, in a place where dust is to be avoided, for example, in a hospital or semiconductor work, a magnetic levitation linear motor of the magnetic repulsion type or magnetic attraction type is used for dust-free transportation. In the dust-free transportation, it is not required to transport heavy goods, therefore an electromagnet consisting of normal conductor(s) is used. As mentioned above, various types of magnetic levitation linear motors have been used for various purposes. In any case, however, it is difficult to control a magnetic field for maintaining a floating state. Accordingly, a transport system using the linear motor becomes expensive.

A high-$T_c$ superconductor whose critical temperature is higher than the liquid nitrogen temperature, has been discovered in recent years. Thus, magnetic levitation and running which utilize the diamagnetism of a superconductor, can be realized by a combination of a magnet and a high-$T_c$ superconductor. This combination is entirely different from the transport system using the above-mentioned magnetic levitation linear motor, and makes possible inexpensive, dust-free non-contact transportation.

Examples of the magnetic levitation apparatus of the diamagnetic type using a high-$T_c$ superconductor will be explained below. In, for example, Nikkan Kogyo Shinbun, Nov. 25, 1987, a high-$T_c$ superconductor is disposed along a slope, to be used as a rail, a magnet is used as a floating body, and the floating body is moved in a horizontal direction by gravity.

In, for example, Shinbun, Mar. 28, 1989. The positional relationship between the high-$T_c$ superconductor and the magnet is reversed, that is, the superconductor is used as the floating body. As in the first example, the superconductor is moved along the slope by gravity.

Page 18 of the digests of the 12th annual conference on 1988 magnetics in Japan held on Sep. 30, 1988, proposes a superconductor which floats over a magnet, and follows the magnet when the magnet is moved on the ground in a horizontal direction.

In abstracts of 38th Meeting on Cryogenics of Japan held in 1987, an arrangement is proposed wherein a magnet floats over a plurality of stripe-shaped superconductors on the ground side, and is moved in a horizontal direction by controlling the superconducting state of each superconductor. That is, the transition between a superconducting state and a normal conducting state is used for driving force.

In JP-A-2-250305 a track having a uniform magnetic field in a running direction is formed of a lifting magnet, and a superconductor floating over the lifting magnet is moved in a horizontal direction by a varying magnetic field generated by the magnets for propulsion.

In the first and second mentioned examples, the moving speed and direction are determined by the slope. That is, no consideration is given as how the movement of the floating body in the horizontal direction is controlled. Further, in the third mentioned example, it is necessary to move the magnet, and the relative position of the floating superconductor for the magnet is kept unchanged. The first to third examples fail to show a satisfactory method of running a body maintained at a floating state. In the fourth example, it is difficult to control the repetition period of the transition between the superconducting state and the normal conducting state, that is, the running speed of the floating body, and moreover a strong driving force cannot be obtained. In the fifth example, also, no thoughtful consideration is not give to a method of driving the floating body made of a superconductor, and detailed explanation of the arrangement of propulsion magnets, the shape of each propulsion magnets and a method of exciting the propulsion for efficiently running the floating body is not found. For example, in an embodiment of the fifth example, the propulsion magnets are disposed on the side surface of the lifting magnet, and thus the center axis of each propulsion magnet is not perpendicular to the floating plane of the superconductor. Accordingly, the magnetic coupling between the propulsion magnets and the superconductor is weak. Further, the propulsion magnets are excited by a pulsive direct current so as to form a magnetic field gradient in a magnetic field which is generated by the lifting magnet and is uniform in a running direction, thereby moving the floating body to a position having a low magnetic potential. The above excitation method, however, cannot produce a strong driving force. Further, according to the above pulsive method, it is necessary to excite a driving magnet in synchronism with the movement of the floating body. It is difficult to excite the propulsion magnet at an appropriate time and to control the running of the floating body.

Further, in the fifth example, not much consideration is given to the shape of the lifting magnet. That is, when the lifting magnet is made up of a plurality of magnet pieces, the uniformity of magnetic field is disturbed at the connecting position of two magnet pieces, and thus it is difficult to obtain a uniform magnetic field all over the lifting magnet.

Additionally, in the fifth example, the stability of the superconductor in a lateral direction in a case where the superconductor runs over the track formed of the lifting magnet, that is, the guidance force for the superconductor is given by a magnetic flux which is generated by the lifting magnet, and enters into and is trapped by the superconductor. Accordingly, a strong guidance force cannot be obtained. Thus, when the superconductor runs over the track, the superconductor is unstable, that is, there arises a problem that the superconductor vibrates in a lateral direction or deviates from the track.

SUMMARY OF THE INVENTION

It is an object of the present invention to provide a superconducting magnetic levitation apparatus which drives a floating body efficiently and controllably, produces a strong driving force, and generates a lifting magnetic field having a uniform intensity in a running direction and produces a guidance force in a lateral direction, to stably run the floating body.

In order to attain the above object, according to the present invention, a superconducting magnetic levitation apparatus includes a lifting magnet for forming a track, a floating body made of a high-$T_c$ superconductor, and a cooling device for maintaining the floating body at a superconducting state. A plurality of coils are disposed on the lifting magnet, to be used as driving electromagnets, for generating a magnetic field necessary for running the floating body with each of the coils being a flat, air-core coil, and with the coils being excitable by a polyphase alternating current. A commercial three-phase alternating current is readily available. Accordingly, the three-phase alternating current is used in all of embodiments described below.

Further, in order to facilitate a formation of a uniform magnetic field in a running direction of a floating body, the lifting magnet is fashioned as a rod having a longitudinal direction parallel to the running direction of the floating body. However, it is not always necessary for the lifting magnetic to be rod-shaped and, for example, the lifting magnet may be fashioned as a parallelogram or a circular arc in accordance with a shape of the track.

In order to stably run the floating body, the lifting magnet is made up of a plurality of magnets arranged in at least two rows in the direction of width of the lifting magnet, that is, in a direction perpendicular to the running direction of the floating body, and thus a steep magnetic field gradient is formed in the direction of width of the lifting magnet. In this case, the magnets, juxtaposed in the direction of width of the lifting magnet, may be different in length and width from each other. Further, adjacent magnetic poles may have the same polarity or different polarities. In a case where the magnets are maintained in close contact with each other, however, the adjacent magnetic poles of the magnets are required to have different polarities. A lifting magnet which is made up of magnets arranged in three rows, is superior in the stability of running of the floating body to a lifting magnet which is made up of magnets arranged in two rows.

When the superconductor approaches the lifting magnet, a shielding current flows in the surface of the superconductor so that the magnetic flux from the lifting magnet is excluded from the superconductor, and the superconductor exists stably over the lifting magnet. Accordingly, the coils disposed on the lifting magnet confront the floating superconductor. The magnetic coupling in this case between the coils and the superconductor is stronger than the magnetic coupling between the superconductor and coil disposed on the side surface of the lifting magnet. Further, the coils disposed between the lifting magnet and the superconductor are flat, that is, small in thickness. Accordingly, the gap between the superconductor and the lifting magnet will be only slightly reduced by the presence of the coils. Furthermore, each of the coils is an air-core coil, and thus a magnetic field which is generated by the lifting magnet and is uniform in the running direction of the superconductor, is scarcely affected by the coils. When the coils are operated, a traveling magnetic field which is generated by exciting the coils (that is, propulsion magnets) by a polyphase alternating current, is superposed on the uniform bias magnetic field. The high-$T_c$ superconductor acting as the floating body is an aggregate of particles. When a magnetic field is applied to this superconductor a shielding current flows as mentioned above, and thus the superconductor behaves like a diamagnetic substance, as a whole. The boundary between particles (that is, grain boundary), however, is a weak bonding portion where the superconducting state is readily destroyed by a small magnetic field. Accordingly, the magnetic field in the floating body is not equal to zero. Thus, when a varying magnetic field is applied to the superconductor, an eddy current flows in the floating body on the basis of an electromotive force given by an equation $E = d\phi/dt$. Hence, like the rotor of an induction motor, the superconductor follows the above-mentioned traveling magnetic field with a time lag (that is, in such a manner that a slip is generated). At this time, the superconductor is applied with a torque which is proportional to the square of the exciting voltage applied to the driving magnets. Further, the running speed of the superconductor is readily controlled by varying the frequency of the alternating current applied to the propulsion magnets. For a superconductor which is made by a conventional method such as the powder method, the above-mentioned slip is large. While, in a high-$T_c$ superconductor which is made by the melting method, a flux pinning force is strong. Hence, for this high-$T_c$ superconductor, the slip can be made small.

Further, the lifting magnet is made up of a plurality of magnets each having the form of a rod whose longitudinal direction is parallel to the running direction of the floating body. Thus, the number of connecting portions on the track is reduced, and the uniformity of magnetic field generated by the lifting magnet is improved.

according to the present invention, the arrangement of propulsion coils, the shape of each propulsion coil and a method of exciting the propulsion coils are optimized. Thus, a floating body can run efficiently while keeping constant the clearance for the floating body (that is, the gap between the floating body and a lifting magnet), and moreover a driving force and the running speed of the floating body can be readily controlled.

Further, the uniformity of the magnetic field due to the lifting magnet in the running direction of the floating body is improved. Accordingly, the floating body can run very smoothly. Furthermore, a steep magnetic field gradient is formed in a direction perpendicular to the running direction of the floating body, that is in the direction of width of the lifting magnet. Accordingly, the stability of running of the floating body is enhanced.

DESCRIPTION OF PREFERRED EMBODIMENT

Embodiments of the present invention will be explained below.

EMBODIMENT-1

Figure 1:
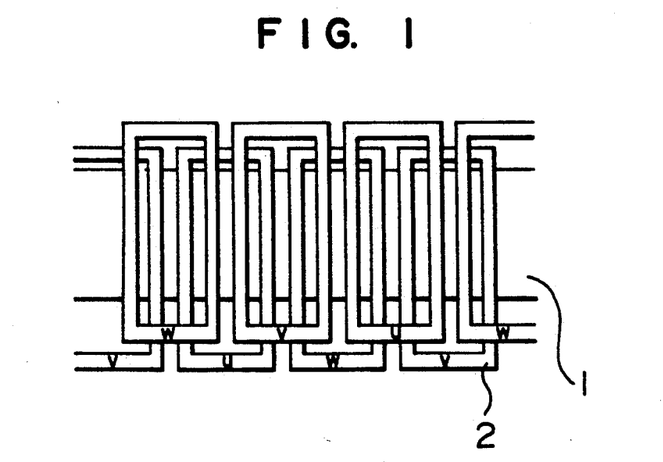
FIG. 1 is a plan schematic view of an arrangement of coils in accordance with a first embodiment of the present invention.

A first embodiment of the present invention will be explained, with reference to FIG. 1. A Sm (samarium)-Co (cobalt) permanent magnet 1 is used for forming the lifting magnet. The permanent magnet 1 has a length of 50 mm in the running direction of a superconducting body, a width of 15 mm in a lateral direction, and a thickness of 5 mm in a floating direction. Further, the permanent magnet 1 is magnetized in the direction of thickness thereof. A plurality of permanent magnets 1 are successively disposed in the running direction of the superconductor so that these magnets are magnetized in the same direction. An iron sheet having a thickness of 0.1 mm is disposed on the permanent magnets to form a track. Flat air-core coils 2, each formed of 100 turns of 0.2-mm diameter enameled copper wire and having a thickness of 1 mm, are disposed on the track so that adjacent coils overlap each other as shown in FIG. 1. Further, overlapping portions of the coils 2 are disposed outside the track.

A high-$T_c$ superconductor (not shown) which contains Tl (thallium), having a diameter of 15 mm and cooled by liquid nitrogen, is lifted out of the track, and the driving coils 2 are excited by a three-phase alternating current as shown in FIG. 1. Thus, the floating superconductor runs smoothly over the track.

In the present embodiment, the thin iron sheet is disposed on the rod-shaped magnets 1 which are connected with one another, to prevent the uniformity of magnetic field from being broken at connecting portions of the magnets 1.

EMBODIMENT-2

Figure 2:
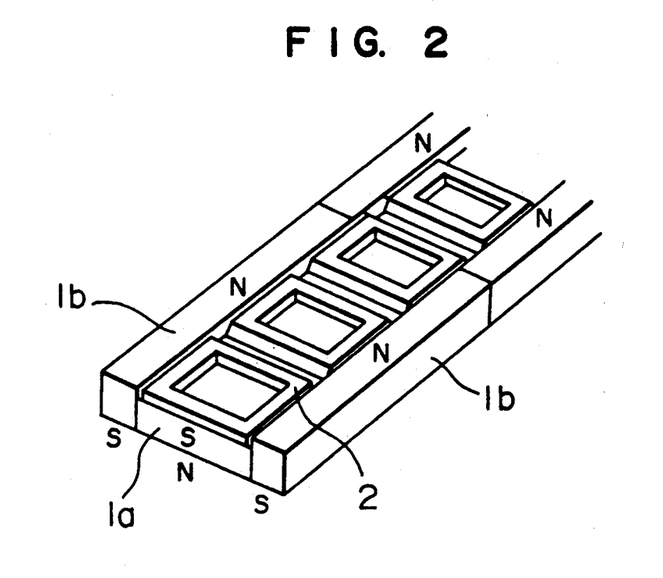
FIG. 2 is a perspective view of a second embodiment of the present invention.

A second embodiment of the present invention will be explained, with reference to FIG. 2. A plurality of Nd (neodymium)-Fe (iron) permanent magnets 1a each having a length of 50 mm, a width of 15 mm and a thickness of 5 mm and a plurality of Sm-Co permanent magnets 1b each having a length of 50 mm, a width of 5 m and a thickness of 7 mm are disposed, as shown in FIG. 2, to form a track. Propulsion coils 2 each having a thickness of 2 mm are disposed on the central magnets 1a serving as the bottom of a groove, as shown in FIG. 2. Each of the coils 2 is formed of 150 turns of 0.2-mm diameter enameled copper wire.

When the coils 2 are excited by a three-phase alternating current as in the first embodiment, a superconductor floating over the track runs smoothly.

Figure 3:
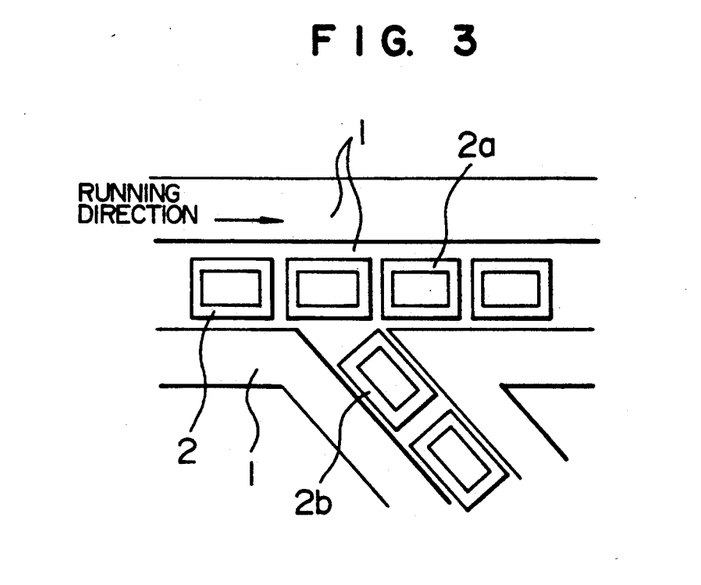
FIG. 3 is a schematic plan view of modified version of the second embodiment, which version includes a branch track.

FIG. 3 shows a case where a branch track is formed by using a permanent magnet having the form of a parallelogram. In a case where a superconductor runs over one of two tracks, propulsion coils on the track are excited by a three-phase alternating current, and that one of driving coils on the other track which exists at the junction of two tracks, is excited by a pulsive direct current to run the superconductor surely over one track. For example, let us consider a case where the superconductor runs straight in FIG. 3. When the superconductor reaches the junction, a coil 2b is excited by a pulse, to form a magnetic wall. On the other hand, in a case where the superconductor makes a turn at the junction, a coil 2a is excited by a pulse.

As can be seen from the above, according to the present invention, a branch track can be formed, and thus the superconductor can run two-dimensionally.

EMBODIMENT-3

Figure 4:
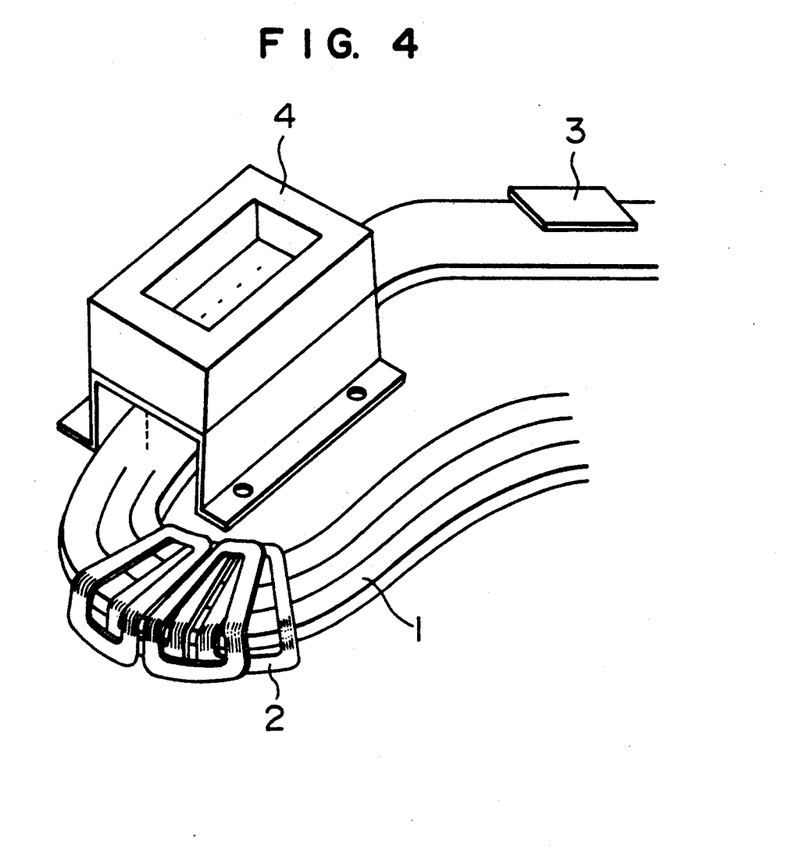
FIG. 4 is a schematic perspective view of a third embodiment of the present invention.

A third embodiment of the present invention will be explained, with reference to FIG. 4. The same permanent magnets as used in the first embodiment are disposed in three rows so that permanent magnets in adjacent rows are different in polarity from each other, though magnetic poles are not shown in FIG. 4. Further the permanent magnets are disposed successively in the running direction of a superconductor so that permanent magnets in each row are magnetized in the same direction. A plurality of permanent magnets 1 each having the form of a circular arc, the same width and thickness as those of the above rod-shaped permanent magnet, and a length nearly equal to the length of the rod-shaped permanent magnet, are disposed at a corner portion of a track, and propulsion coils 2 with flat shape are disposed on the lifting magnets like the first embodiment. A cooling device 4 whose bottom is provided with a plurality of 0.5-mm diameter through holes, is disposed on the track. The cooling device 4 is filled with liquid nitrogen, to make a liquid drop fall. A rectangular superconductor 3 having a width of 15 mm, a length of 30 mm and a thickness of 2 mm is lifted out of the track, and the propulsion coils 2 are excited by an alternating current having a frequency of 120 Hz to run the superconductor.

According to the present embodiment, a steep magnetic field gradient is formed in the direction of width of the track. Thus, the present embodiment is superior in stability of running of the floating superconductor to the first embodiment.

EMBODIMENT 4

Figure 5:
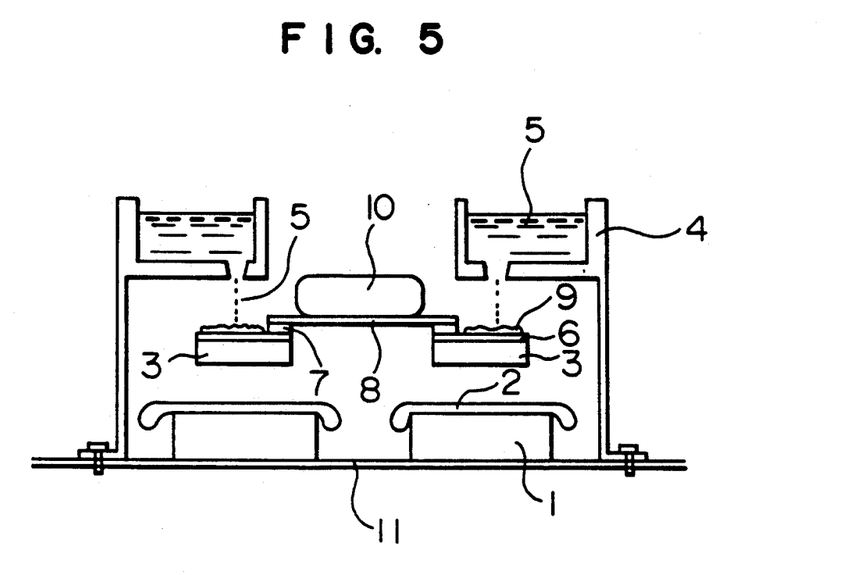
FIG. 5 is a schematic front view of a fourth embodiment of the present invention, in which a superconducting magnetic levitation apparatus is used for forming a transport system.

A fourth embodiment of the present invention will be explained, with reference to FIG. 5. A pair of parallel tracks, each of which is the same as the track used in the third embodiment, are formed to obtain a transport path having a length of 10 m. A pair of lifting magnets 1 are attracted to an iron plate 11 having a thickness of 1.5 mm, to be fixed thereto. A superconductor 3 lifted out of each track is put in close contact with a heat sink plate 6 having a thickness of 0.1 mm, and a pair of heat sink plates 6 are coupled with each other through a pair of heat-insulating members 7 and a connecting rod 8. Further, cotton is attached to each heat sink plate 6, to be used as a coolant absorber 9. A cooling device 4, filled with liquid nitrogen 5, is disposed on the transport path at an interval of 2 m.

Thus, a carried body 10 placed on the connecting rod 8 can be transported without being put in contact with the ground.

According to the present embodiment, the thermal stability of the superconductor 3 is improved by the coolant absorber 9 and the heat sink plate 6. Although cotton is used as the coolant absorber in the present embodiment, the coolant absorber is not limited to cotton, but paper and cloth can produce the same effect as obtained by cotton.

EMBODIMENT-5

Figure 6:
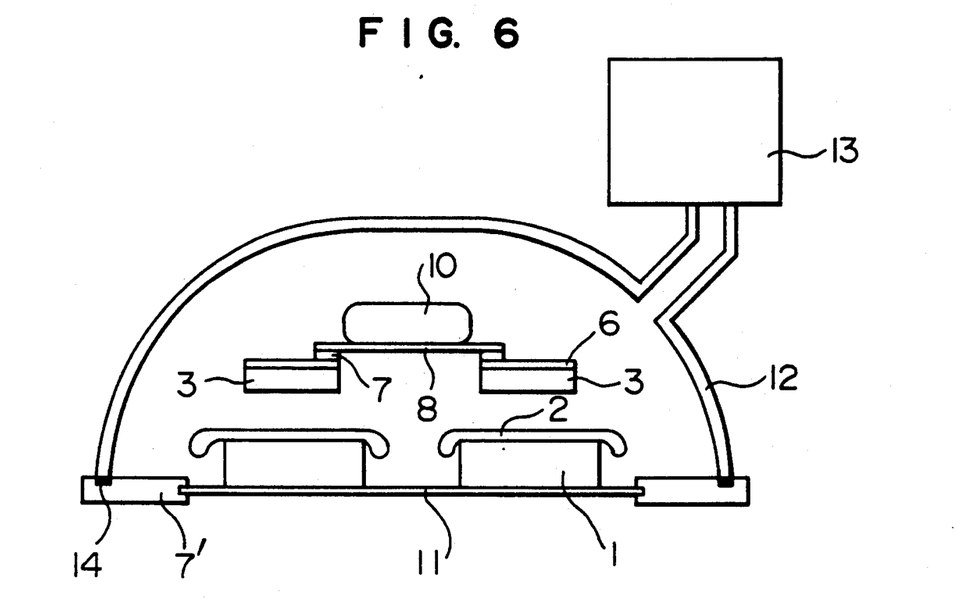
FIG. 6 is a schematic front view of a fifth embodiment of the present invention in which a cooling means differing from the fourth embodiment of the present invention is employed.

A fifth embodiment of the present invention will be explained, with reference to FIG. 6. The same tracks and floating bodies as used in the fourth embodiment are covered with an adiabatic vacuum vessel 12, and a refrigerating machine 13 is connected to the vacuum vessel 12. The iron plate 11 for fixing the tracks is coupled with the vacuum vessel 12 through a heat insulating member 7' and a vacuum seal 14.

Thus, as in the fourth embodiment, the carried body 10 can be transported without being put in contact with the ground.

According to the present embodiment, the transport path is full covered with the adiabatic vacuum vessel 12, and the inside of the vessel 12 is kept at a temperature lower than the critical temperature of the high-$T_c$ superconductor 3 by the refrigerating machine 13. Thus, the floating body can stop successively at desired positions on the transport path. Further, ultra-low-speed transportation which is impossible in the fourth embodiment, can be made in the present embodiment.

EMBODIMENT-6

Figure 7:
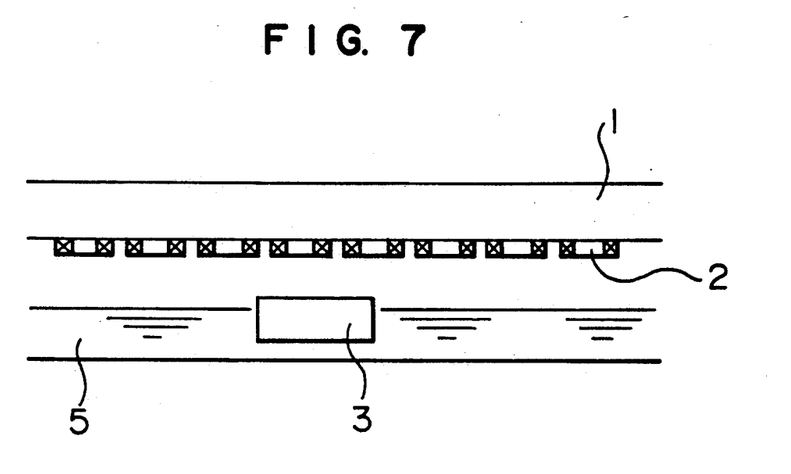
FIG. 7 is a schematic side view of a sixth embodiment of the present invention, in which a high-$T_c$ superconductor, made by the melting method, is held under a magnet.

A sixth embodiment of the present invention will be explained, with reference to FIG. 7. A high-$T_c$ superconductor which is made by the melting method, is used as a floating body 3. The superconductor is cooled by liquid nitrogen, to be put in a superconducting state. Then, a lifting magnet 1 approaches the superconductor so that the magnetic flux from the lifting magnet 1 enters into the superconductor.

Thus, the floating body 3 is lifted as if the floating body were suspended from a track made up of the lifting magnet 1 and propulsion coils 2, and can run along the track.

According to the present embodiment, the floating body is held under the lifting magnet. Thus, the floating body can be dipped in and cooled by liquid nitrogen placed under the track, and hence the floating time of the superconductor can be elongated. Further, the floating body made by the melting method has a strong flux pinning force, and thus follows the traveling magnet field due to the propulsion coils 2 very well, that is, the above-mentioned slip is reduced. Although, in the present embodiment, the floating body is held under the lifting magnet, it is, needless to say, that the floating body may be held over the lifting magnet as in the first to fifth embodiments.

EMBODIMENT-7

In the first to sixth embodiments, explanation has been made of a case where a high-$T_c$ superconductor is used as a floating body. Now, a seventh embodiment of the present invention, that is, a case where a high-$T_c$ superconductor is used for forming a track and a magnet is used as a floating body, will be explained, with reference to FIG. 8.

Figure 8:
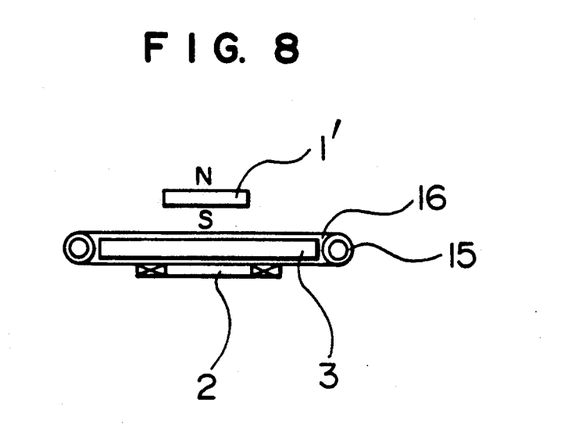
FIG. 8 is a schematic front view of a seventh embodiment of the present invention, in which a magnet is used as a floating body.

A high-$T_c$ superconductor 3 is buried in solder 16 applied to a copper pipe 15, to form a track. Further, indium which has a low melting point and is unreactive to the high-$T_c$ superconductor, is used as the solder. Propulsion coils 2 are disposed under the track. The high-$T_c$ superconductor 3 is put in a superconducting state by flowing liquid nitrogen through the copper pipe 15, and thus a magnet 1' is lifted out of the track. Thereafter, the propulsion coils 2 are excited by a three-phase alternating current, to generate a traveling magnetic field, thereby running the magnet 1' which has been lifted out of the track.

According to the present embodiment, the propulsion coils 2 are disposed under the high-$T_c$ superconductor 3, and thus the gap between the magnet 1' and the track, that is, a clearance is not reduced by the propulsion coils 2. In this arrangement, also, the magnetic flux generated by the propulsion coils 2 can penetrate a weak bonding portion of the high-$T_c$ superconductor such as a grain boundary, and thus can magnetically act on the magnet 1'. In the present embodiment, the magnet 1' follows the traveling magnetic field without any time lag, that is, the running speed of the magnet 1' is equal to the so-called synchronous speed.

In the present embodiment, the propulsion coils 2 are disposed under the high-$T_c$ superconductor 3 so as not to reduce the above-mentioned clearance. It is, needless to say, that the magnet 1' can run in a case where the propulsion coils 2 are disposed on the upper side of the high-$T_c$ superconductor 3, too. Although liquid nitrogen flows through the copper pipe 15 to cool the high-$T_c$ superconductor 3, the coolant is not limited to liquid nitrogen but, for example, a helium gas and a nitrogen gas which are cooled to a temperature lower than the critical temperature of the high-$T_c$ superconductor 3, may be used as the coolant.

In order to explain the operation of the lifting magnet which is made up of magnets arranged in a plurality of rows in a direction of width of the lifting magnet, a case where the lifting magnet is made up of magnets arranged in three rows to improve the stability of running of the floating body will be explained by way of an example.

Figure 9:
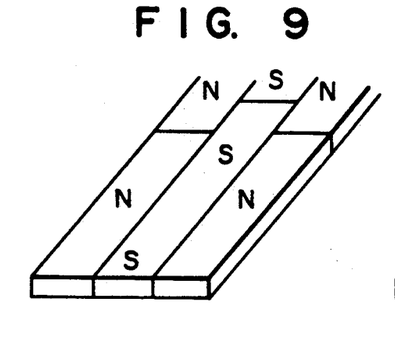
FIGS. 9, 11, 13 and 15 are schematic perspective views showing the arrangement of lifting magnets.
Figure 10:
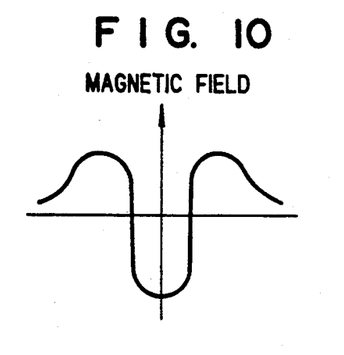
FIGS. 10, 12, 14 and 16 are graphical illustrations respectively showing magnetic field distribution for the arrangements of lifting magnets in FIGS. 9, 11, 13 and 15, respectively.
Figure 11:
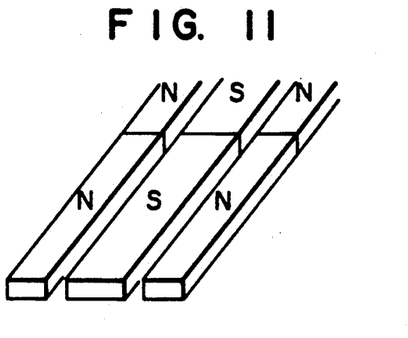
Figure 12:
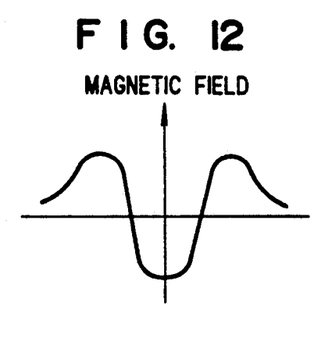
Figure 13:
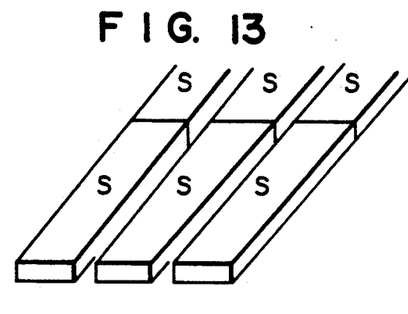
Figure 14:
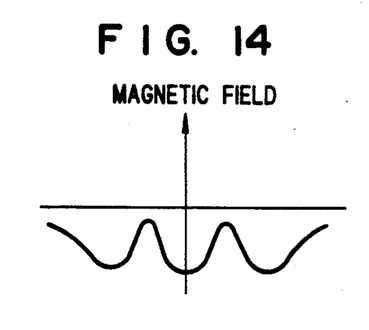
Figure 15:
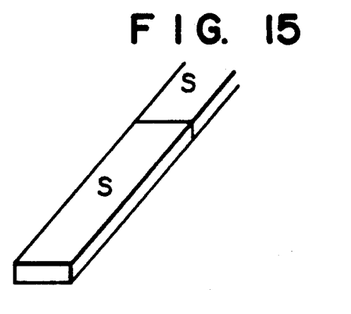
Figure 16:
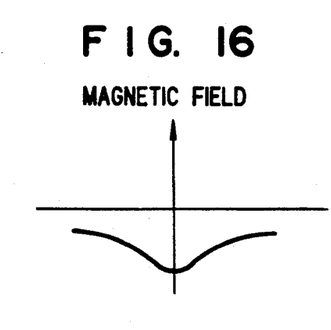
Figure 17:
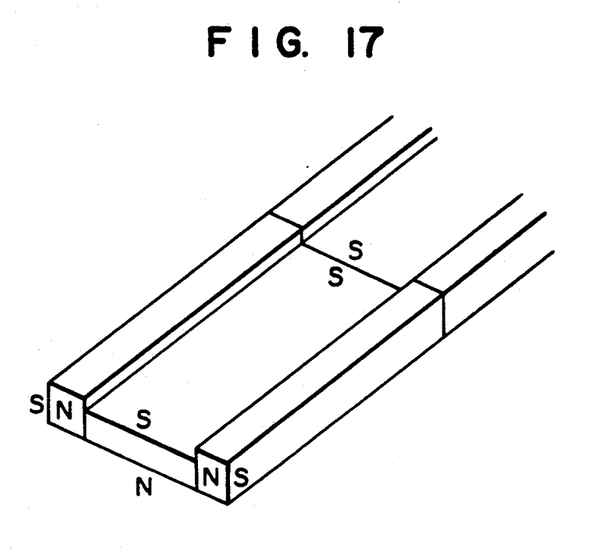
FIG. 17 is a perspective view of a modified version of the arrangement of the lifting magnets of FIGS. 9, 11 and 13, in which version lifting magnets different in thickness and direction of magnetization from each other are combined.

When three magnets for making up the lifting magnet are arranged as shown in FIGS. 9, 11 and 13, the magnetic field distribution formed by the lifting magnet is graphically illustrated in FIGS. 10, 12 and 14, respectively. The magnetic field distribution of FIGS. 10, 12 and 14 indicates the distribution of a vertical component of the magnetic field at the floating position of the semiconductor, that is, the distribution of the magnetic field component in a superconductor lifting direction, along a width of the lifting magnet. An example of where the lifting magnet is made up of magnets arranged in a single row is shown in FIG. 15 for the sake of comparison. The magnetic field distribution in this example is shown in FIG. 17.

As can be seen from FIGS. 10, 12, 14 and 16, where the lifting magnet is made up of magnets arranged in three rows, it is possible to generate a steeper magnetic field gradient in a direction of width of the lifting magnet as compared with a situation wherein the lifting magnet is made up of magnets arranged in a single row. This steep magnetic field gradient exists continuously along the track, over which the superconductor runs, and acts as a magnetic wall for the superconductor.

That is, when the superconductor runs over the track, the magnetic field gradient operates as a guidance force. Due to this guidance force, the superconductor can run stably without deviating from the track.

When magnetic poles having different polarities are arranged in a direction of width of the lifting magnet as shown in FIGS. 9 and 11, a steeper magnetic field gradient is formed, as compared with a situation where the magnetic poles have the same polarity and are arranged in the direction shown in FIG. 13. More particularly, when three magnets arranged in three rows are maintained in close contact with each other as shown in FIG. 9, a very steep magnetic field gradient is formed. Further, when the magnets are arranged so as to be different in the direction of magnetization and width from each other to form the lifting magnet as shown in FIG. 17, a steep magnetic field gradient similar to that obtained by the arrangement of FIG. 9 is formed.

We claim:

1. A upper conducting magnetic levitation apparatus comprising:
    a floating body made of a high-$T_c$ superconductor;
    a lifting magnet for generating a magnetic field necessary to put the floating body in a floating state;
    a plurality of propulsion coils constituting three phases for causing the floating body to run; and
    a device for cooling the floating body,
    wherein the lifting magnet is constituted by at least three rows of strip shaped magnets extended along a running path of the floating body, said striped shaped magnets being arranged so that a distribution of a vertical component magnetic field is formed continuously along the running path of the floating body.

2. A super conducting magnetic levitation apparatus comprising:
    a floating body made of a high-$T_c$ superconductor;
    a lifting magnet for generating a magnetic field necessary to put the floating body in a floating state;
    a plurality of propulsion coils constituting three phases for causing the floating body to run; and
    a device for cooling the floating body,
    wherein the lifting magnet includes at least three rows of strip shaped magnets extended along a running path of the floating body, said striped shaped magnets being arranged so that opposite polarity of the magnets adjoin each other so as to form a distribution of a vertical component magnetic field continuously along the running path of the floating body.

3. A superconducting magnetic levitation apparatus according to claim 2, wherein a plurality of lifting magnets each are fashioned as a long rod, a surface of at least one of the lifting magnets confronting the floating body is fashioned as one of a trapezoid or parallelogram so that the running track of the floating body is separated into at least two tracks, wherein propulsion coils on one of the tracks where the floating body is running, are excited by a polyphase alternating current, and wherein at least one of the propulsion coils on a branch portion of the other track where the floating body is not running, is supplied with a pulsive direct current so that a magnetic flux generated by the propulsion coil is equal in direction to a magnetic flux generated by the lifting magnet, to stably run the floating body over one track at a junction of the at least two tracks.

4. A superconducting magnetic levitation apparatus, comprising at least one floating body made of a high-$T_c$ superconductor, at least one running track having at least one lifting magnet for generating a magnetic field necessary to put the floating body in a floating state, a device for cooling the floating body, and a plurality of propulsion coils for causing the at least one floating body to run along the running track, wherein said plurality of propulsion coils are disposed in close proximity to the at least one lifting magnet, the running track includes a plurality of lifting magnets each being fashioned as a long rod, a longitudinal direction of the long rod extends in parallel to the running direction of the floating body, the lifting magnet includes a plurality of magnets arranged in at least three rows, a central row of the three rows of magnets has a thickness less than a thickness of the remaining magnets to form a groove, and wherein the propulsion coils are disposed in the groove.

5. A transport employing a superconducting magnetic levitation apparatus according to claim 4.

6. A superconducting magnetic levitation apparatus comprising at least one floating body made of a high-$T_c$ superconductor, at least one running track having at least one lifting magnet for generating a magnetic field necessary to put the floating body in a floating state, and a plurality of propulsion coils for causing the at least one floating body to run along the running track, wherein said plurality of propulsion coils are disposed in close proximity to the at least one lifting magnet, each of the propulsion coils is a flat air-core coil, the running track includes a plurality of lifting magnets each being fashioned as a long rod, a longitudinal direction of the long rod extends in parallel to the running direction of the floating body, the lifting magnet comprises a plurality of magnets arranged in at least three rows, a central row of the rows of magnets has a thickness less than a thickness of the remaining magnets to form a groove, and wherein the propulsion coils are disposed in the groove.

7. A transport system employing a superconducting magnetic levitation apparatus according to claim 6.

8. A superconducting magnetic levitation apparatus comprising:
    a floating body made of a high-$T_c$ superconductor;
    a lifting magnet for generating a magnetic field necessary to put the floating body in a floating state;
    a plurality of propulsion coils constituting three phases for causing the floating body to run; and
    a device for cooling the floating body,
    wherein the lifting magnet is constituted by at least three rows of strip shaped magnets extended along a running path of the floating body, said striped shaped magnets being arranged so that a steep magnetic gradient is formed along the running path of the floating body.

9. A superconducting magnetic levitation apparatus according to claim 8, wherein the propulsion coils are excited by a polyphase alternating current.

10. A superconducting magnetic levitation apparatus according to claim 8, wherein a plurality of lifting magnets each are fashioned as a long rod, a surface of at least one of the lifting magnets confronting the floating body is fashioned as one of a trapezoid or parallelogram so that the running track of the floating body is separated into at least two tracks, wherein propulsion coils on one of the tracks where the floating body is running, are excited by a polyphase alternating current, and wherein at least one of the propulsion coils on a branch portion of the other track where the floating body is not running, is supplied with a pulsive direct current so that a magnetic flux generated by the propulsion coil is equal in direction to a magnetic flux generated by the lifting magnet, to stably run the floating body over one track at a junction of the at least two tracks.

11. A superconducting magnetic levitation apparatus according to claim 8, wherein the high-$T_c$ superconductor is fashioned of metal bulk material.

12. A superconducting magnetic levitation apparatus according to claim 8, wherein each of the propulsion coils is a flat, air-core coil.

13. A superconducting magnetic levitation apparatus according to claim 12, wherein the propulsion coils are excited by a polyphase alternating current.

14. A superconducting magnetic levitation apparatus according to claim 12, wherein each of the propulsion coils has a width larger than a width of the at least one lifting magnet, and wherein the propulsion coils are disposed so as to overlap each other.

15. A superconducting magnetic levitation apparatus according to claim 8, wherein each of the propulsion coils has a width larger than a width of the at least one lifting magnet, and wherein the propulsion coils are disposed so as to overlap each other.

16. A superconducting magnetic levitation apparatus according to claim 3, wherein overlapping portions of the propulsion coils are formed on one of the outside or inside of the at least one lifting magnet, and wherein portions of the propulsion coils which just lie beyond the at least one lifting magnet, are bent downwardly.

17. A superconducting magnetic levitation apparatus according to claim 8, wherein the running track includes a plurality of lifting magnets each being fashioned as a long rod, and wherein a longitudinal direction of the long rod extends in parallel to the running direction of the floating body.

18. A superconducting magnetic levitation apparatus according to claim 17, wherein a thin sheet made of a ferromagnetic material is interposed between the lifting magnet and the propulsion coils.

* * * * *